(12) United States Patent
Kottem et al.

(10) Patent No.: US 12,179,925 B2
(45) Date of Patent: Dec. 31, 2024

(54) QUICK RELEASE SYSTEM AND METHOD FOR AN INTERIOR AIRCRAFT CABIN APPARATUS

(71) Applicant: B/E Aerospace, Inc., Winston-Salem, NC (US)

(72) Inventors: Raghavendra Kottem, Telangana (IN); Arjun Koustubhan, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/215,349

(22) Filed: Jun. 28, 2023

(65) Prior Publication Data
US 2024/0308668 A1    Sep. 19, 2024

(30) Foreign Application Priority Data

Mar. 16, 2023    (IN) .............................. 202311017815

(51) Int. Cl.
*B64D 11/06*    (2006.01)
*B60N 2/015*    (2006.01)

(52) U.S. Cl.
CPC ...... *B64D 11/0696* (2013.01); *B60N 2/01508* (2013.01)

(58) Field of Classification Search
CPC .......... B64D 11/0696; B60N 2/01508
See application file for complete search history.

(56) References Cited

U.S. PATENT DOCUMENTS 9,592,748 B2 * 3/2017 Gordeenko ........ B60N 2/01516
10,800,290 B2 * 10/2020 Gross ................ B60N 2/01541
11,465,750 B2 10/2022 Gross
11,524,788 B2 12/2022 Roth et al.
2002/0167207 A1 11/2002 Larson
2005/0236862 A1 10/2005 Martone et al.
(Continued)

FOREIGN PATENT DOCUMENTS

DE    10036551 A1    9/2001
EP    2803580 B1    7/2018
EP    3666652 B1    10/2021

OTHER PUBLICATIONS

Gulfstream 2-Place Divan; Aviation Fabricators, https://avfab.com/products/view/gulfstream-g1-i-g2-ii-g3-iii-g4-iv-2-place-divan/.
(Continued)

*Primary Examiner* — Amy J. Sterling
(74) *Attorney, Agent, or Firm* — Suiter Swantz IP

(57) ABSTRACT

A quick release system for an interior apparatus is disclosed. The system may include a release assembly including a release handle and release cables. The release handle may pull the release cables when a force is applied. The system may include a latch assembly including latches coupled to the release cables. The latches may include a latch hook positioned in an open position or a closed position. Upon applying the force to the release handle, the latch hook may release the apparatus to cause the apparatus to rotate about an axis. The system may include a locking assembly including a lever and a lock plate. Upon applying the force to the release handle, the lock plate may translate between the locked position and the unlocked position to disengage the lock plate from the tracks to cause the apparatus to translate along the tracks.

15 Claims, 24 Drawing Sheets

(56) References Cited

U.S. PATENT DOCUMENTS

| | | |
|---|---|---|
| 2010/0096502 A1* | 4/2010 | VanderWolk ...... B64D 11/0696 248/503.1 |
| 2010/0308619 A1 | 12/2010 | Hoge et al. |
| 2016/0090181 A1 | 3/2016 | Breuer |
| 2018/0194476 A1 | 7/2018 | Gross |
| 2019/0308736 A1* | 10/2019 | Gross ................. B64D 11/0696 |
| 2020/0086997 A1* | 3/2020 | Suarez ..................... B60N 2/43 |
| 2020/0385126 A1 | 12/2020 | Ward |
| 2022/0089288 A1 | 3/2022 | Warren et al. |

OTHER PUBLICATIONS

European Patent Office, Search Report received in EP Application No. 23220470, May 27, 2024, 8 pages.

* cited by examiner

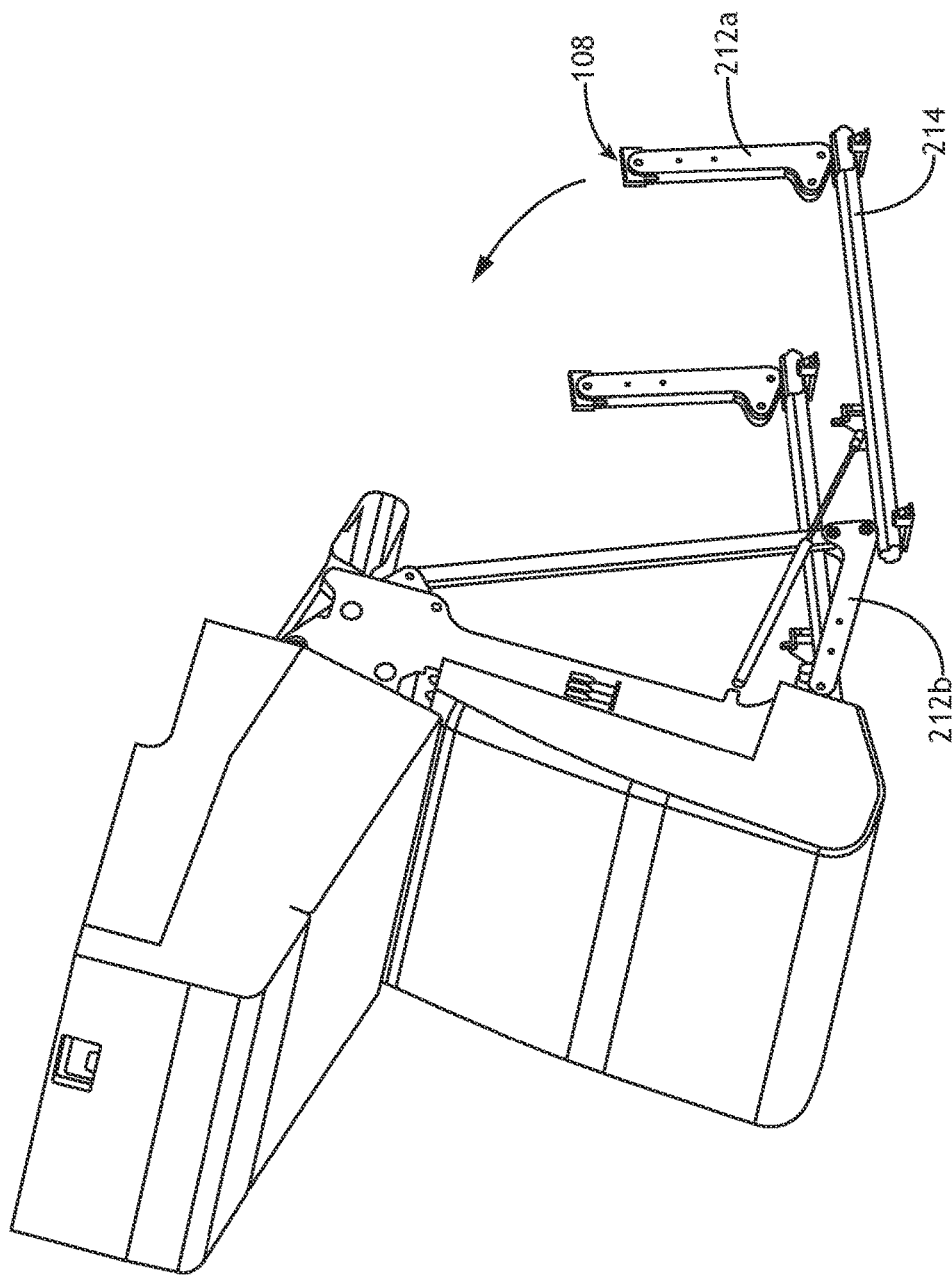

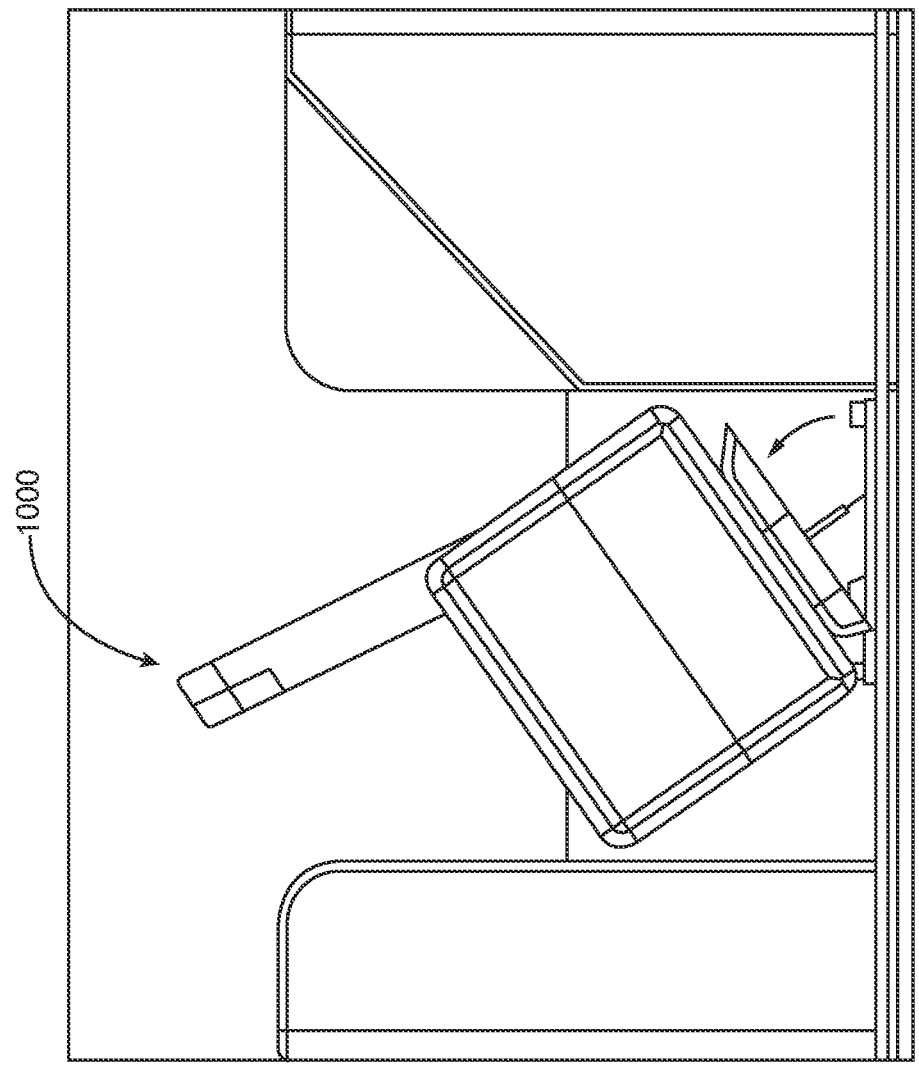

QUICK RELEASE SYSTEM AND METHOD FOR AN INTERIOR AIRCRAFT CABIN APPARATUS

CROSS-REFERENCE TO RELATED APPLICATIONS

The present application claims priority to India Provisional Patent Application No. 20/231,1017815, filed Mar. 16, 2023, entitled QUICK RELEASE SYSTEM AND METHOD FOR AN INTERIOR AIRCRAFT CABIN APPARATUS, naming Raghavendra Kottem and Arjun Koustubhan as inventors, which is incorporated herein by reference in the entirety.

BACKGROUND

Accessing equipment and accessories positioned behind or beneath interior aircraft cabin apparatuses (e.g., divans, aircraft seats, or monuments) is often difficult. Current removal processes require the interior aircraft cabin apparatus to be completely removed. For example, the divan and/or aircraft seat may need to be fully removed from the seat track to access such equipment and accessories (e.g., ducts, dado panels, harnesses, decompression grills, and the like).

SUMMARY

A quick release system for an interior aircraft cabin apparatus is disclosed, in accordance with one or more embodiments of the present disclosure. In embodiments, the system includes a release assembly including one or more release handles and one or more release cables, the one or more release cables coupled to the one or more release handles, the one or more release handles configured to pull the one or more release cables when a force is applied to the one or more release handles. In embodiments, the system includes a latch assembly including one or more latches coupled to the one or more release cables, the one or more latches including one or more latch hooks configured to be positioned in one of an open position or a closed position, upon applying the force to the one or more release handles, the one or more latch hooks, when in the open position, are configured to release a portion of the interior aircraft cabin apparatus to cause the interior aircraft cabin apparatus to rotate about an axis. In embodiment, the system includes a locking assembly including a lever and a lock plate, the lever coupled to the one or more release cables, the lock plate arranged proximate to one or more interior aircraft cabin apparatus tracks couplable to a floor of an aircraft cabin, the lock plate configured to be positioned in one of a locked position or an unlocked position, upon applying the force to the one or more release handles, the lock plate is configured to translate between the locked position and the unlocked position to disengage the lock plate from a portion of the one or more interior aircraft cabin apparatus tracks to cause the interior aircraft cabin apparatus to translate along an axis of the one or more interior aircraft cabin apparatus tracks.

In some embodiments, the interior aircraft cabin apparatus may include a divan.

In some embodiments, the latch assembly may be coupled to a rear portion of the one or more interior aircraft cabin apparatus tracks and the latch assembly may be positioned proximate to one or more rear legs of the divan.

In some embodiments, the divan may be configured to rotate about a front axis of one or more leg brackets of one or more front legs.

In some embodiments, the latch assembly may be coupled to one or more rear legs of the divan and the one or more rear legs may be fixed to the one or more tracks coupled to the floor of the aircraft cabin.

In some embodiments, the divan may be configured to rotate about a front axis of one or more leg brackets of one or more front legs.

In some embodiments, the divan may include a seat frame and the seat frame may include a seatback frame and a seat pan frame. The seatback frame may include a seatback cushion and the seat pan frame may include a seat pan cushion.

In some embodiments, the one or more release handles may be coupled to a portion of the seat pan frame.

In some embodiments, one of the seatback cushion or the seat pan cushion may be removed prior to applying the force to the one or more release handles coupled to the portion of the sat pan frame.

In some embodiments, the interior aircraft cabin apparatus may include an aircraft seat.

In some embodiments, the interior aircraft cabin apparatus may include an aircraft cabin monument.

In some embodiments, the system further includes an actuation assembly and the actuation assembly may include one or more actuators configured to assist with one of the rotation or the translation.

In some embodiments, the one or more actuators may include at least one gas spring actuator.

In some embodiments, the one or more latches may include one or more rotary latches.

In some embodiments, the one or more latch hooks may be configured to rotate between one of the open position or the closed position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 6A illustrates a simplified schematic view of a quick release system for a divan, in accordance with one or more embodiments of the present disclosure.

FIGS. 10A-10C illustrates a simplified schematic of an aircraft seat using the quick release system, in accordance with one or more embodiments of the present.

DETAILED DESCRIPTION OF THE INVENTION

Figure 1:
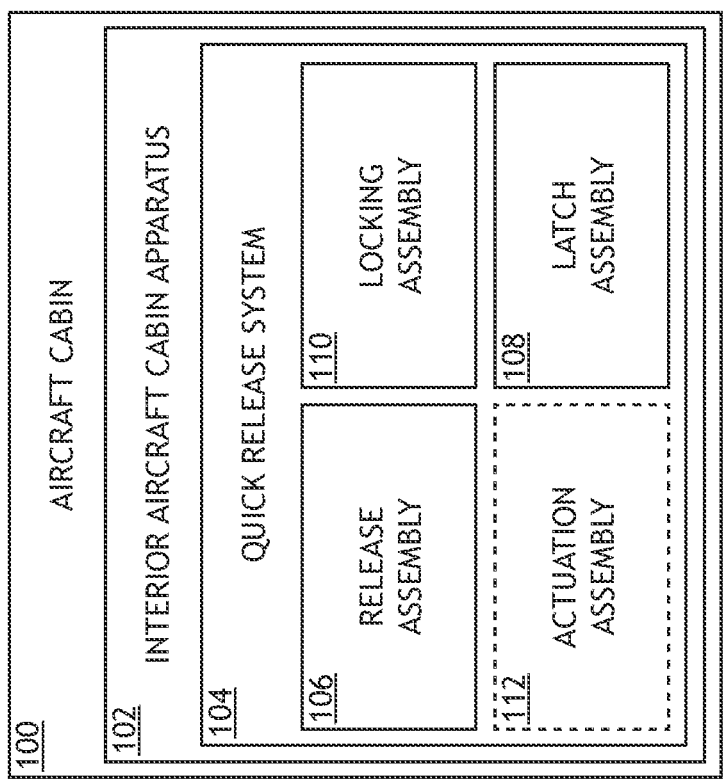
FIG. 1 illustrates a simplified block diagram of an aircraft cabin including a quick release system for an interior aircraft cabin apparatus, in accordance with one or more embodiments of the present disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-10C in general illustrate a quick release system and method for an interior aircraft cabin apparatus, in accordance with one or more embodiments of the disclosure.

Accessing equipment and accessories positioned behind or beneath interior aircraft cabin apparatuses (e.g., divans, aircraft seats, or monuments) is often difficult. Current removal processes require the interior aircraft cabin apparatus to be completely removed. For example, the divan and/or aircraft seat may need to be fully removed from the seat track to access such equipment and accessories (e.g., ducts, dado panels, harnesses, decompression grills, and the like).

As such, it would be desirable to provide a quick release system for an interior aircraft cabin apparatus. The system should allow users (e.g., crew members, maintenance crew members, and the like) to access equipment and/or accessories e.g., ducts, dado panels, harnesses, decompression grills, and the like) behind or proximate to the interior aircraft cabin apparatus (e.g., divan, monument, aircraft seat, and the like). For example, the system should be configured to rotate (e.g., tumble) and translate (e.g., slide) to allow the user(s) to quickly access the equipment and/or accessories e.g., ducts, dado panels, harnesses, decompression grills, and the like). The system should be hidden such that passengers do not have access to system to rotate/translate the system and gain access to the equipment and/or accessories. For example, the system may be accessed by removing the cushions, storage drawer, and/or shell of the interior cabin apparatus to access the quick release mechanism of the system. The system should meet aviation guidelines and/or standards.

FIG. 1 illustrates an aircraft cabin 100, in accordance with one or more embodiments of present disclosure.

Figure 8A:
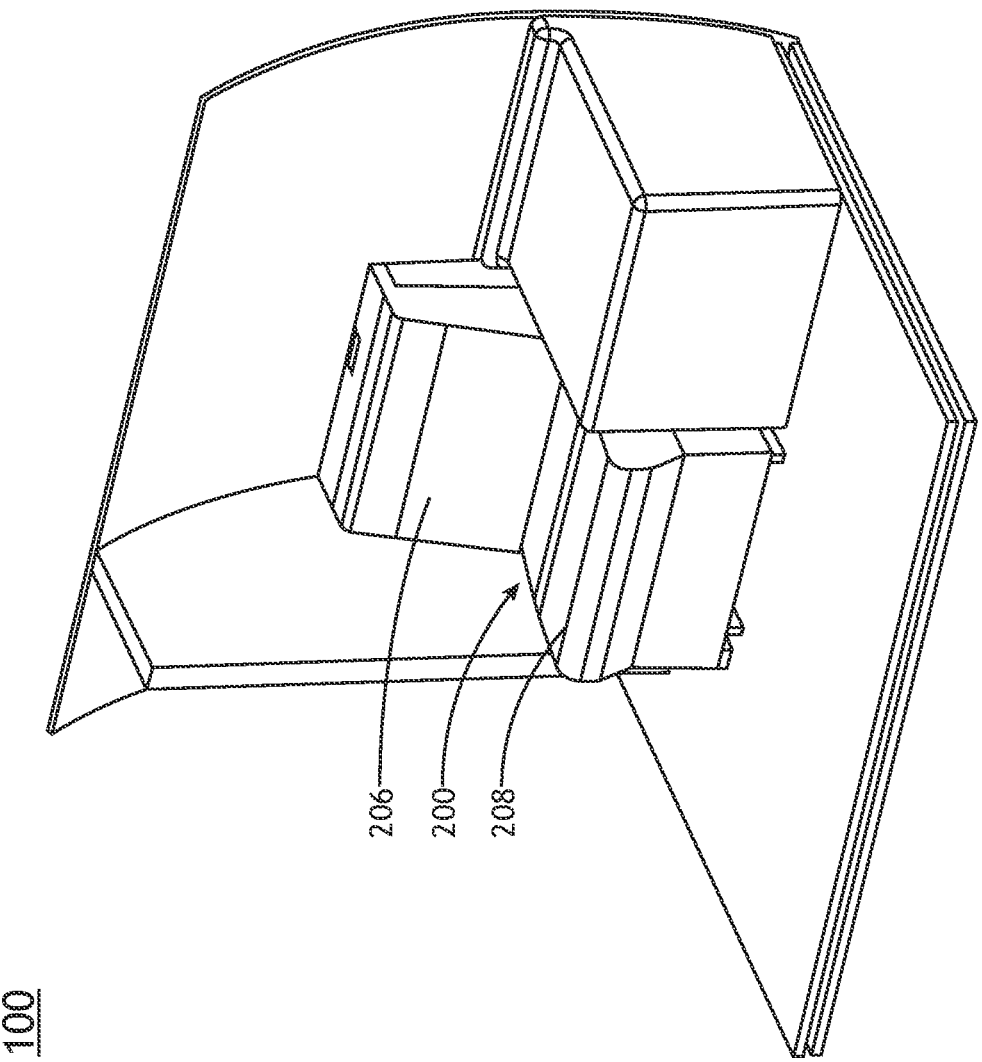
FIGS. 8A-8E illustrates a simplified schematic of a method or process of rotating and sliding a divan using the system, in accordance with one or more embodiments of the present disclosure.
Figure 8B:
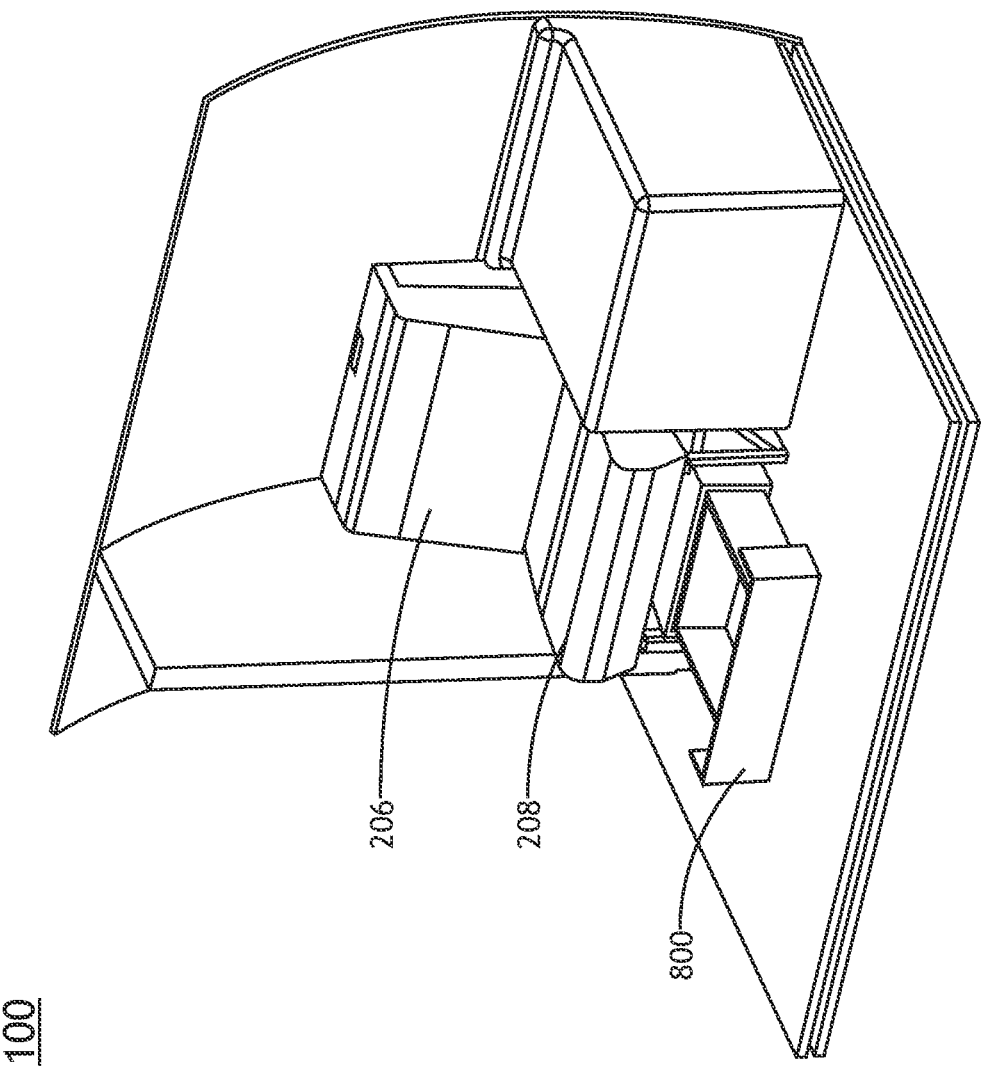
Figure 8C:
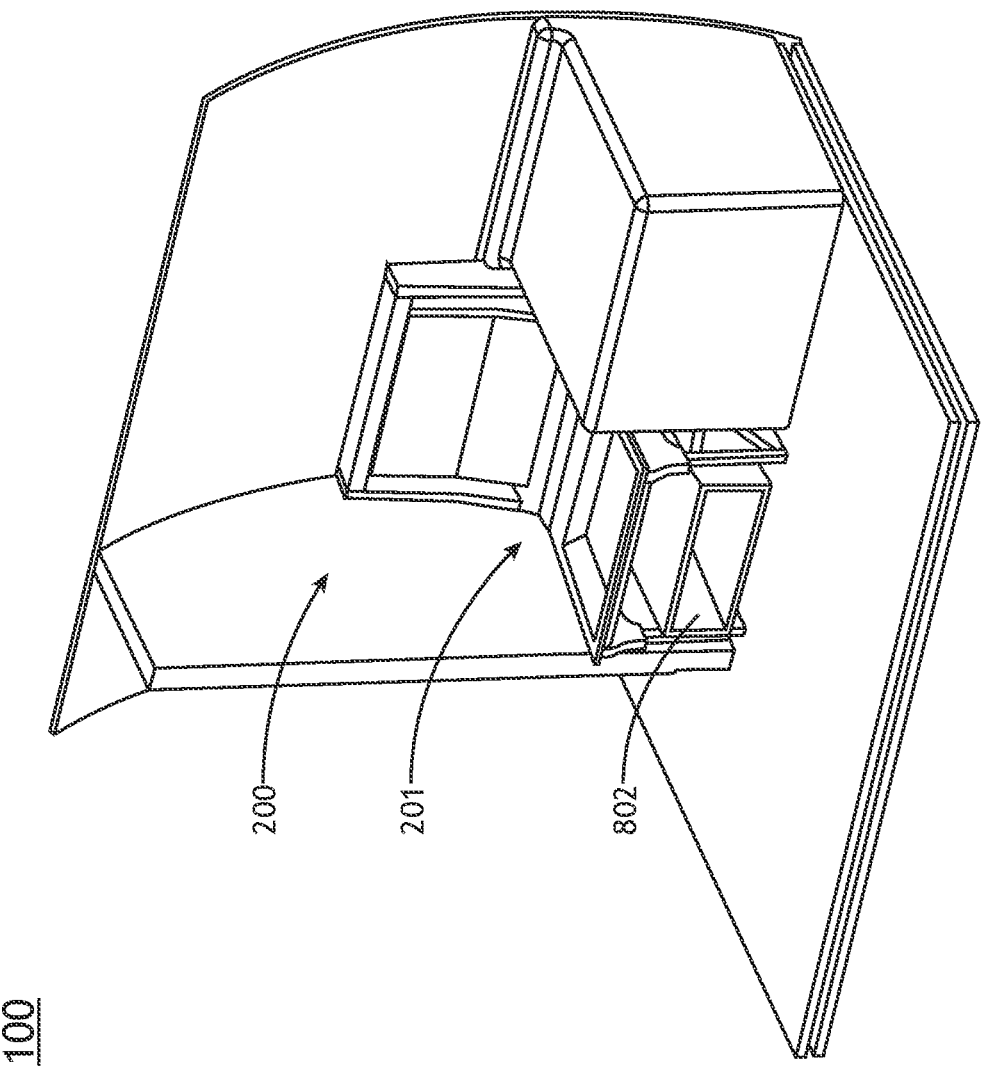
Figure 8D:
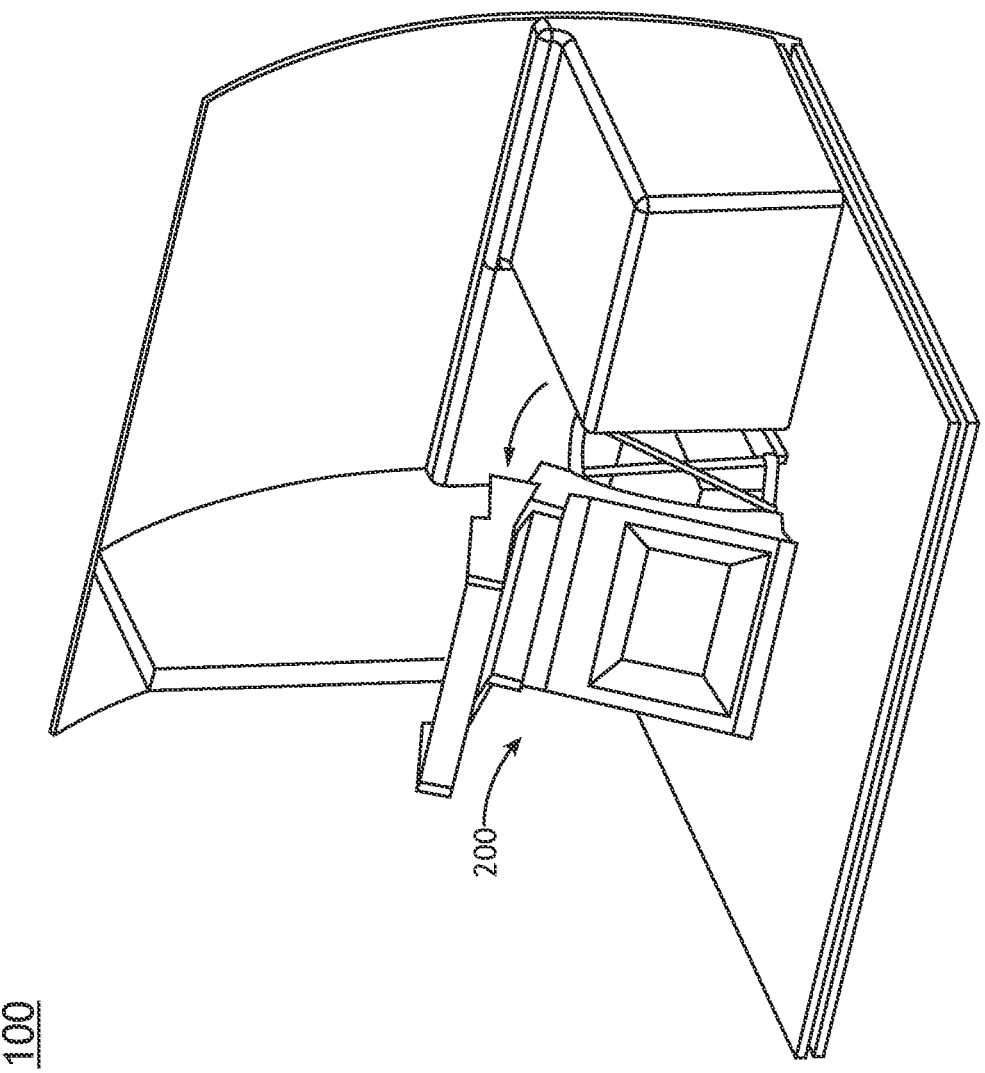
Figure 8E:
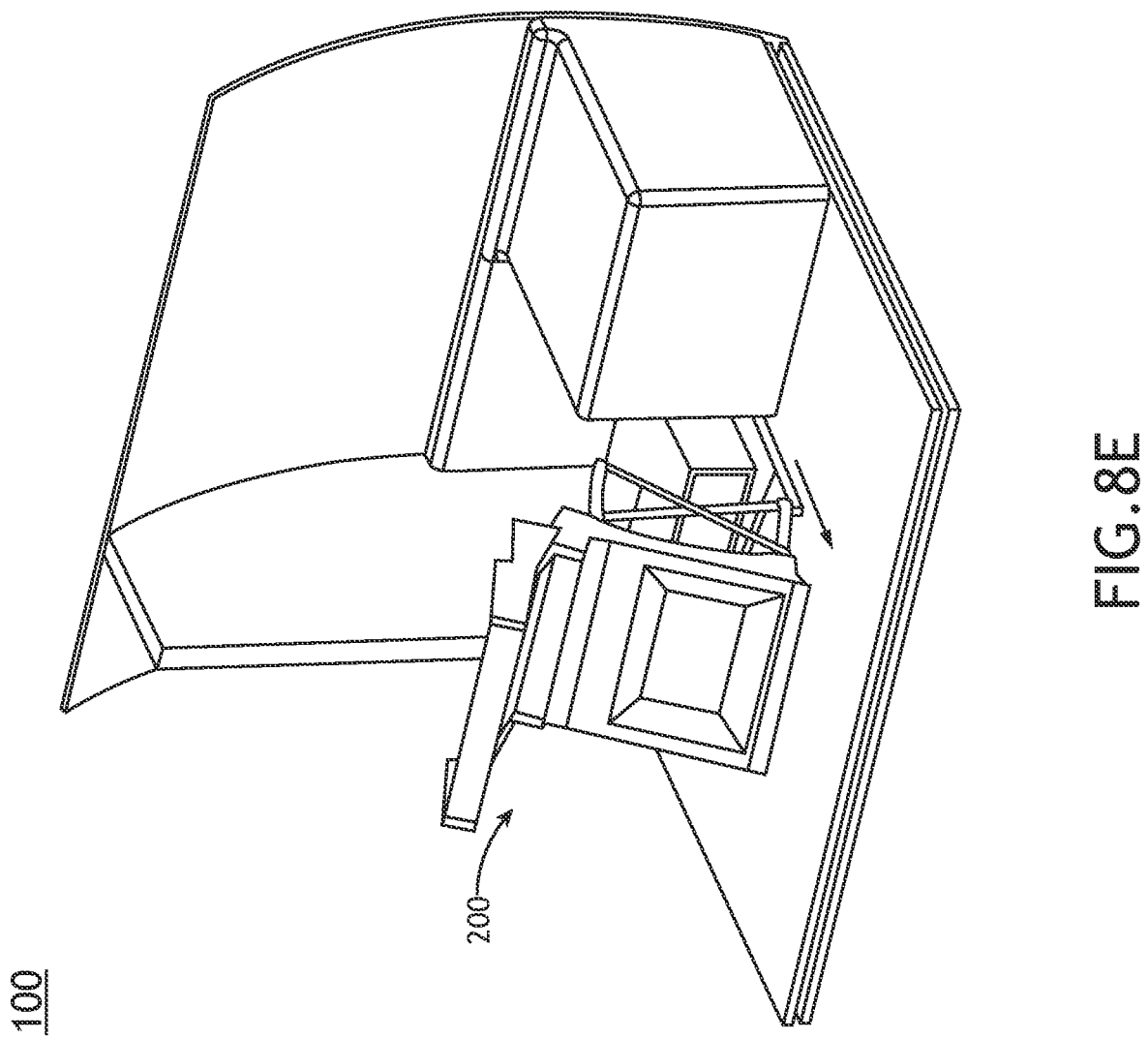
Figure 9A:
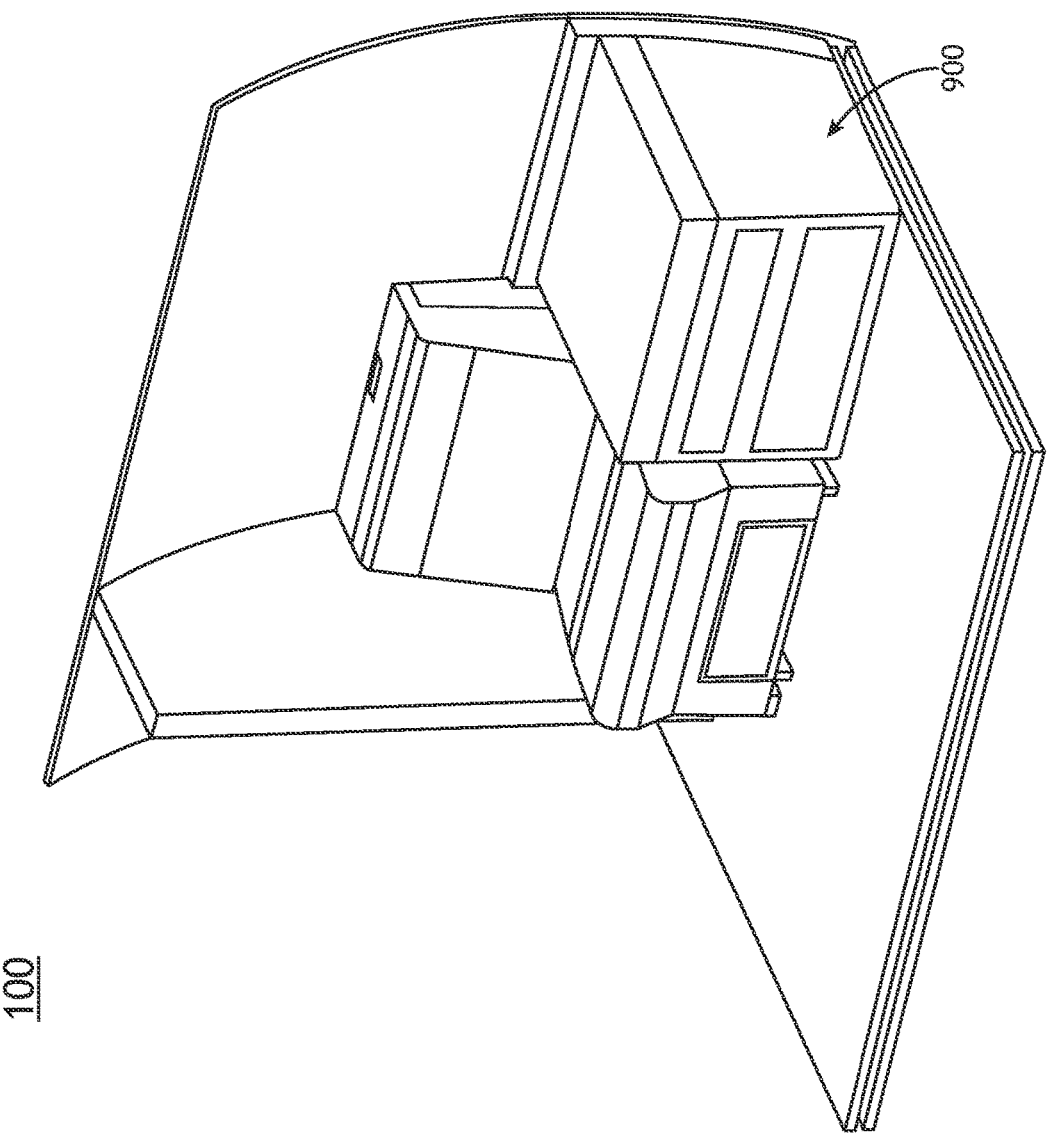
FIGS. 9A-9B illustrates a simplified schematic of a monument using the quick release system, in accordance with one or more embodiments of the present.
Figure 9B:
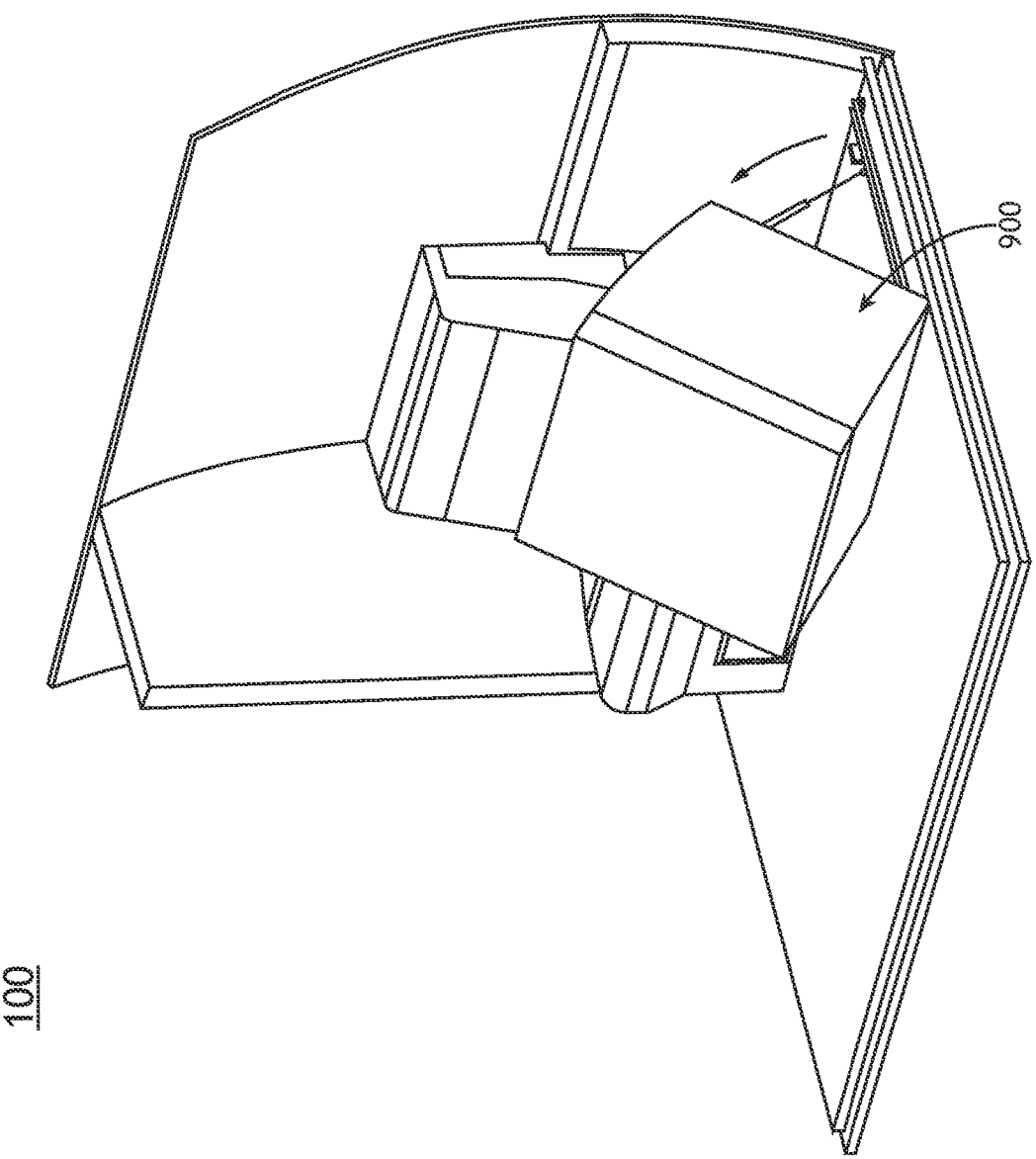

The aircraft cabin 100 may include one or more interior aircraft cabin apparatuses 102. For example, the aircraft cabin 100 may include one or more divans (as shown in FIGS. 8A-8E). By way of another example, the aircraft cabin 100 may include one or more monuments (as shown in FIGS. 8A-8B). By way of another example, the aircraft cabin 100 may include one or more aircraft seats (as shown in FIGS. 9A-9B). For purposes of the present disclosure the terms "interior aircraft cabin apparatuses", "interior apparatuses", "aircraft cabin apparatuses", "interior cabin apparatuses", "cabin apparatuses", and variations thereof may be considered equivalent, unless otherwise noted herein.

The one or more interior aircraft cabin apparatuses 102 may include a quick release system 104 configured to rotate (e.g., tumble) and translate (e.g., slide) the one or more interior aircraft cabin apparatuses 102, such that equipment or accessories (e.g., ducts, dado panels, harnesses, decompression grills, and the like) proximate to the one or more interior aircraft cabin apparatuses 102 may be easily accessed. For example, the one or more interior aircraft cabin apparatuses 102 may be rotatable about an axis (e.g., swivelable) or translatable (e.g., trackable or slidable).

The quick release system 104 may include, but is not limited to, a release assembly 106, a latch assembly 108, and a lock assembly 110, as will be discussed further herein. In some embodiments, the quick release system 104 may further include an actuation assembly 112, as will be discussed further herein.

Figure 2:
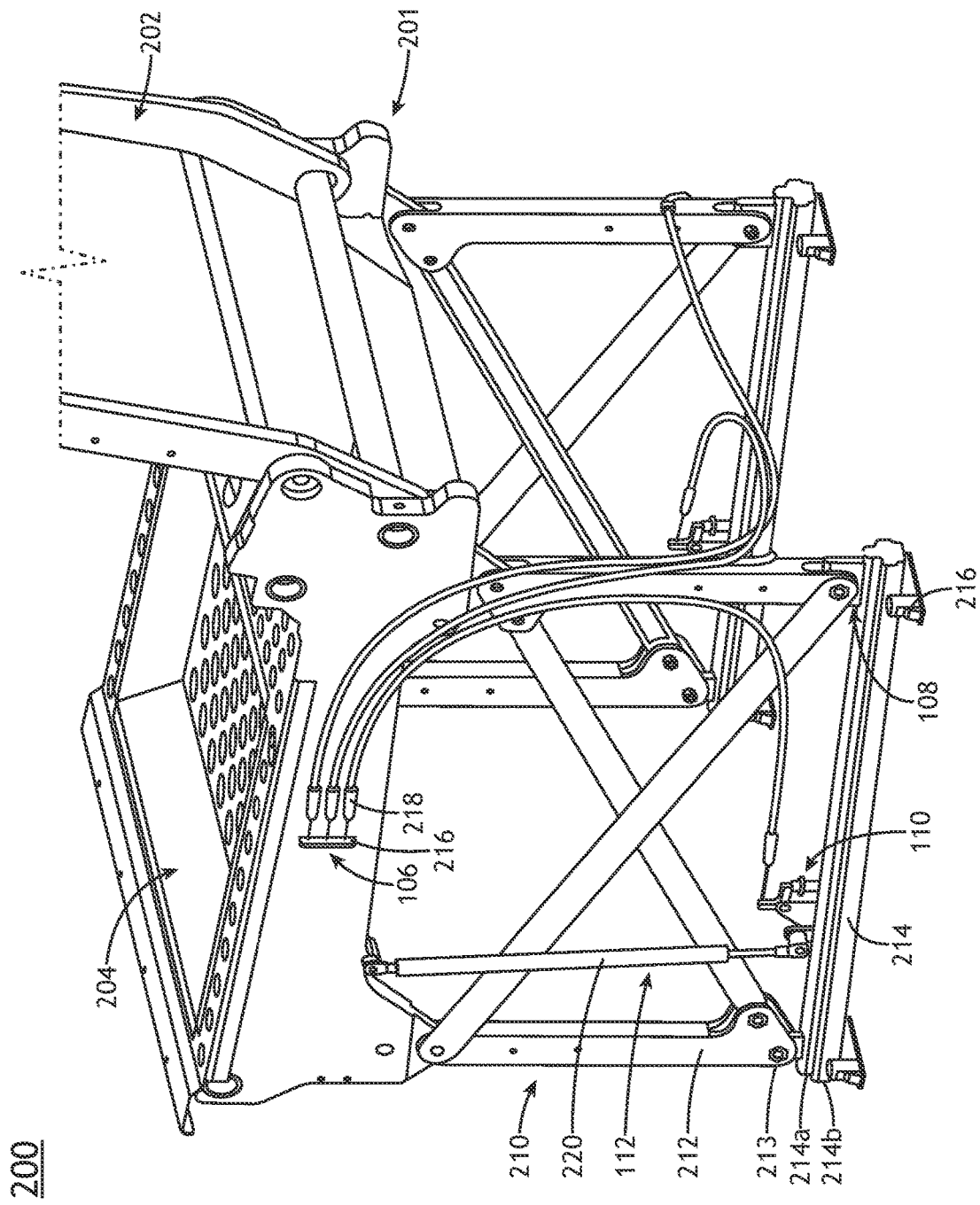
FIG. 2 illustrates a simplified schematic of the quick release system for a divan, in accordance with one or more embodiments of the present disclosure.
Figure 3A:
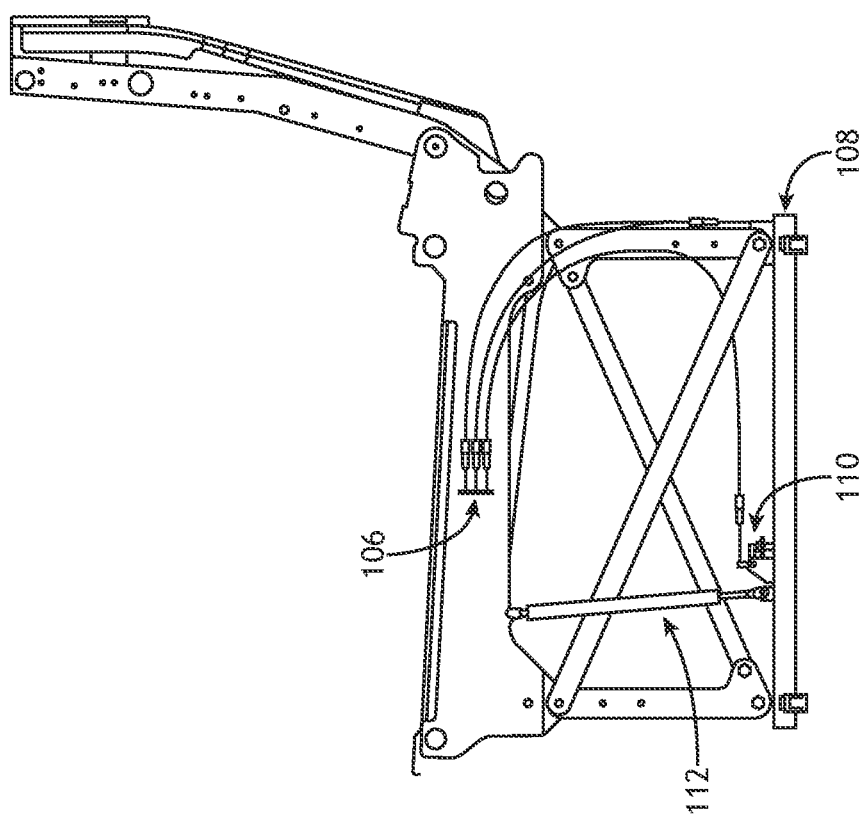
FIG. 3A illustrates a simplified schematic of a quick release system for a divan in a stowed position, in accordance with one or more embodiments of the present disclosure.
Figure 3B:
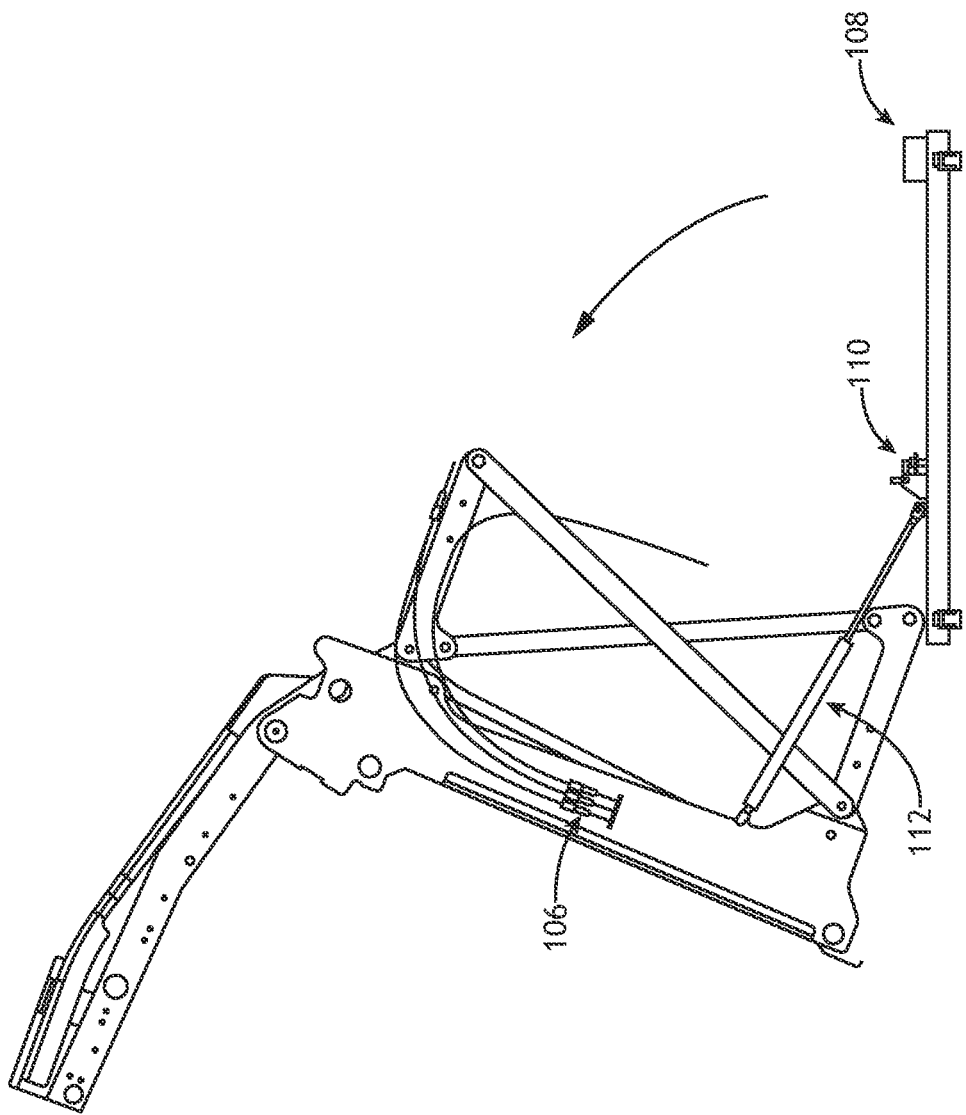
FIG. 3B illustrates a simplified schematic of the quick release system for a divan in a tumbled position, in accordance with one or more embodiments of the present disclosure.
Figure 3C:
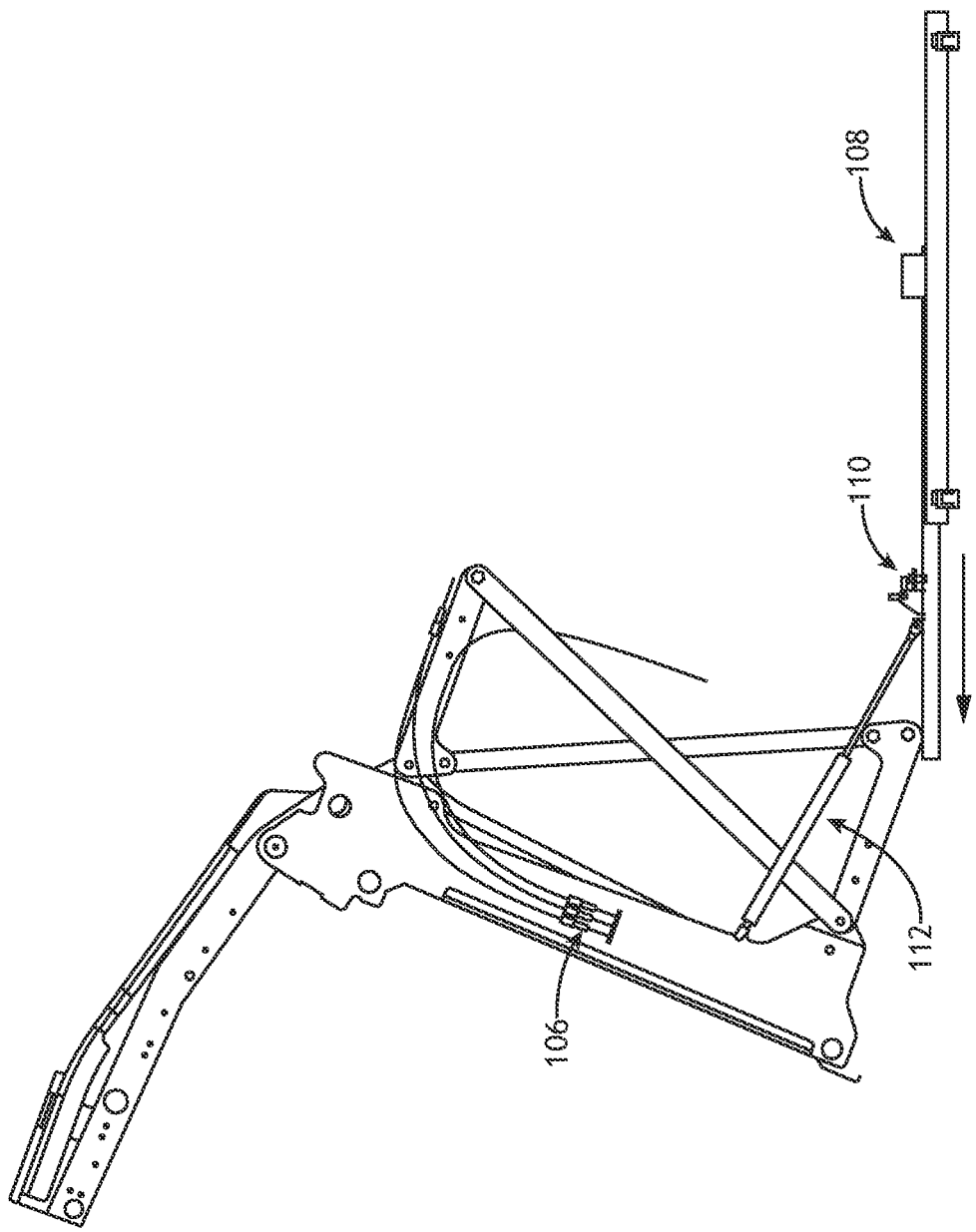
FIG. 3C illustrates a simplified schematic of the quick release system for a divan in a translated position, in accordance with one or more embodiments of the present disclosure.

FIG. 2 illustrates a simplified schematic of the quick release system 104 for a divan 200, in accordance with one or more embodiments of the present disclosure. FIGS. 3A-3C illustrate simplified schematics of the quick release system 104 for the divan 200, in accordance with one or more embodiments of the present disclosure. In particular, FIG. 3A depicts the quick release system for the divan 200 in a stowed position, in accordance with one or more embodiments of the present disclosure. In particular, FIG. 3B depicts the quick release system for the divan 200 in a rotated (e.g., tumbled) position, in accordance with one or more embodiments of the present disclosure. In particular, FIG. 3C depicts the quick release system for the divan in the translated (e.g., slid) position, in accordance with one or more embodiments of the present disclosure.

Referring generally to FIG. 2, the divan 200 may include a frame 201. The frame 201 may include a seatback frame 202 and a seat pan frame 204.

The seatback frame 202 may include a seatback cushion 206 (shown in FIGS. 8A-8E). The seat pan frame 204 may include a seat pan cushion 208 (shown in FIGS. 8A-8E).

The divan 200 may include a base assembly 210. The base assembly 210 may include one or more legs 212.

The frame 201 may be couplable to the base assembly 210. For example, the frame 201 may be couplable to the base assembly 210 via the one or more legs 212. For instance, the frame 201 may be coupled to the base assembly 210 via one or more leg brackets 213 coupled to the one or more legs 212.

The base assembly 210 may be couplable to a floor of the aircraft cabin 100. For example, the base assembly 210 may be couplable to the floor via one or more tracks 214, one or more track fittings 216 (or track fasteners), and the like.

The one or more tracks 214 may include an upper track 214a and a lower track 214b.

The release assembly 106 may be coupled to a portion of the frame 201. For example, at portion of the release assembly 106 may be coupled to a portion of the seat pan frame 204. In this regard, the release assembly 106 may be accessible upon removal of the cushions (e.g., seatback cushion and seat pan cushion).

The latch assembly 108 may be coupled to the one or more tracks 214 and the one or more legs 212. For example, a portion of the latch assembly 108 may be coupled to the one or more leg brackets 213 of the one or more legs 212 and a complementary portion of the latch assembly 108 may be coupled to a respective portion of the one or more tracks 214. For instance, a first latch assembly 108 may be coupled to a portion of a first track 214 (e.g., a rear portion) and a second latch assembly 108 may be coupled to a portion of a second track 214 (e.g., rear portion).

The release assembly 106 may be coupled to a portion of the frame 201. For example, at portion of the release assembly 106 may be coupled to a portion of the seat pan frame 204. In this regard, the release assembly 106 may be accessible upon removal of the cushions (e.g., seatback cushion and seat pan cushion).

The lock assembly 110 may be coupled to the one or more tracks 214. For example, a portion of a first lock assembly 110 may be coupled to a portion of a first track 214 and a portion of a second lock assembly 110 may be coupled to a portion of a second track.

In some embodiments, the actuator assembly 112 may be coupled to the one or more tracks 214 and a portion of the frame 201. For example, a first end of the actuator assembly 112 may be coupled to portion of the seat pan frame 204 and a second end of the actuator assembly 112 may be coupled to a portion of the one or more tracks 214.

Referring to FIGS. 3A-3C, the divan 200 may be positioned between one of the stowed position or the deployed position via the quick release system 104. For example, as shown in FIG. 3A, the divan 200 may be positioned in the stowed position. By way of another example, as shown in FIGS. 3B-3C, the divan 200 may be positioned in the deployed position. In one instance, the divan 200 may be rotated about an axis (e.g., tumbled or swiveled), as shown in FIG. 3B, and translated along one or more tracks (e.g., slid), as shown in FIG. 3C. In another instance, the divan 200 may be translated along one or more tracks (e.g., slid), as shown in FIG. 3C, and rotated about an axis (e.g., tumbled or swiveled), as shown in FIG. 3B. In this regard, when in the deployed position, equipment and/or accessories positioned proximate to the divan 200 may be easily accessed.

The release assembly 106 may include a release handle 216 coupled to a portion of the frame 201. For example, the release handle 216 may be coupled to a portion of the seat pan frame 204. Although FIG. 2 depicts the release handle 216 coupled to the seat pan frame 204, it is noted that the release handle 216 may coupled to any portion of the divan 200. Further, although FIG. 2 depicts a single release handle 216, it is noted that the system 104 may include any number of release handles 216.

The release assembly 106 may further include one or more release cables 218. For example, the release handle 216 may be coupled to one or more release cables 218. In this regard, a user may pull the release handle 216 to cause the one or more release cables 218 to be pulled, such that the divan 200 may be rotated and/or translated.

The one or more release cables 218 may be configured to unlock the latch assembly 108. For example, the release handle 216 may be configured to pull the one or more cables 218 to unlock the latch assembly 108. In this regard, the divan 200 may be rotated (or tumbled) about a front bracket 213 mounted on a portion of the one or more tracks 214.

The actuator assembly 112 may include one or more actuators 120. For example, the actuator assembly 112 may include one or more spring-assisted actuators 120 configured to assist the divan 200 to rotate to the tumbled position. It is noted that the actuator assembly 112 may include any type of actuator suitable for assisting the apparatus 102 to rotate to the tumbled position.

The one or more release cables 218 may be configured to unlock the lock assembly 110. For example, the release handle 216 may be configured to pull the one or more cables 218 to unlock the lock assembly 110. In this regard, the divan 200 may be translated along the one or more tracks 214.

FIGS. 4A-4D illustrate simplified schematics of the latch assembly 108 the quick release system 104 for the divan 200, in accordance with one or more embodiments of the present disclosure.

The latch assembly 108 may include one or more latches 400. It is noted that the latch assembly 108 may include any type of suitable latch such as, but not limited to, one or more rotary latches, and the like.

The one or more latches 400 may be coupled to one or more portions of a seat track 214. For example, the one or more latches 400 may be coupled to one or more rear portions of the seat track 214. For instance, the one or more latches 400 may be coupled to a rear portion of the upper track 214a (outboard portion).

The one or more latches 400 may be positioned proximate to one or more leg brackets 213 of the one or more legs 212 of the divan 200. When in the closed position, the latch hook 402 of the one or more latches 400 may be configured to engage a portion of the leg bracket 213. For example, the latch hook 402 of the one or more latches 402 may be configured to enclose at least a portion of the one or more leg brackets 213 of the one or more legs 212, as shown in FIGS. 4C-4D.

Figure 4A:
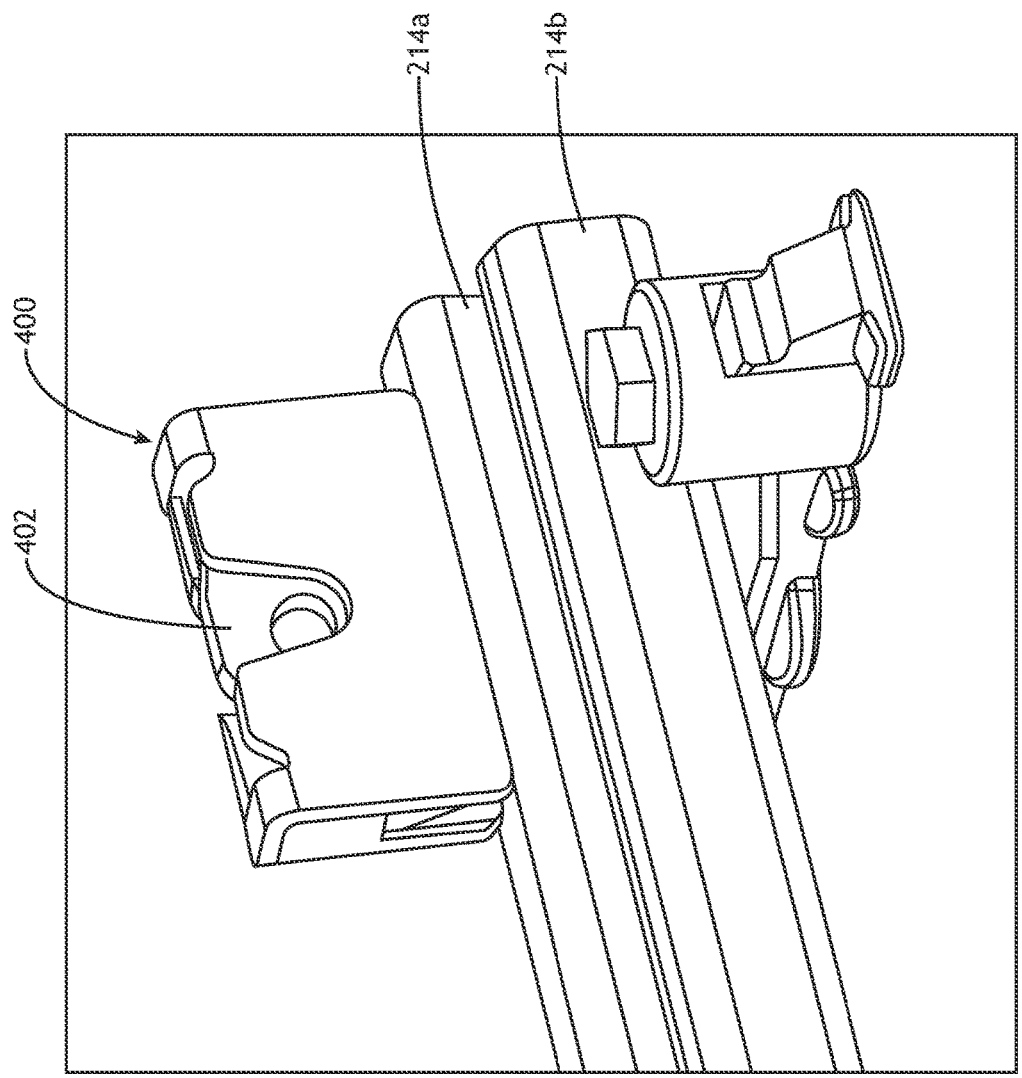
FIG. 4A illustrates an exploded view of a latch assembly of the system, in accordance with one or more embodiments of the present disclosure.
Figure 4B:
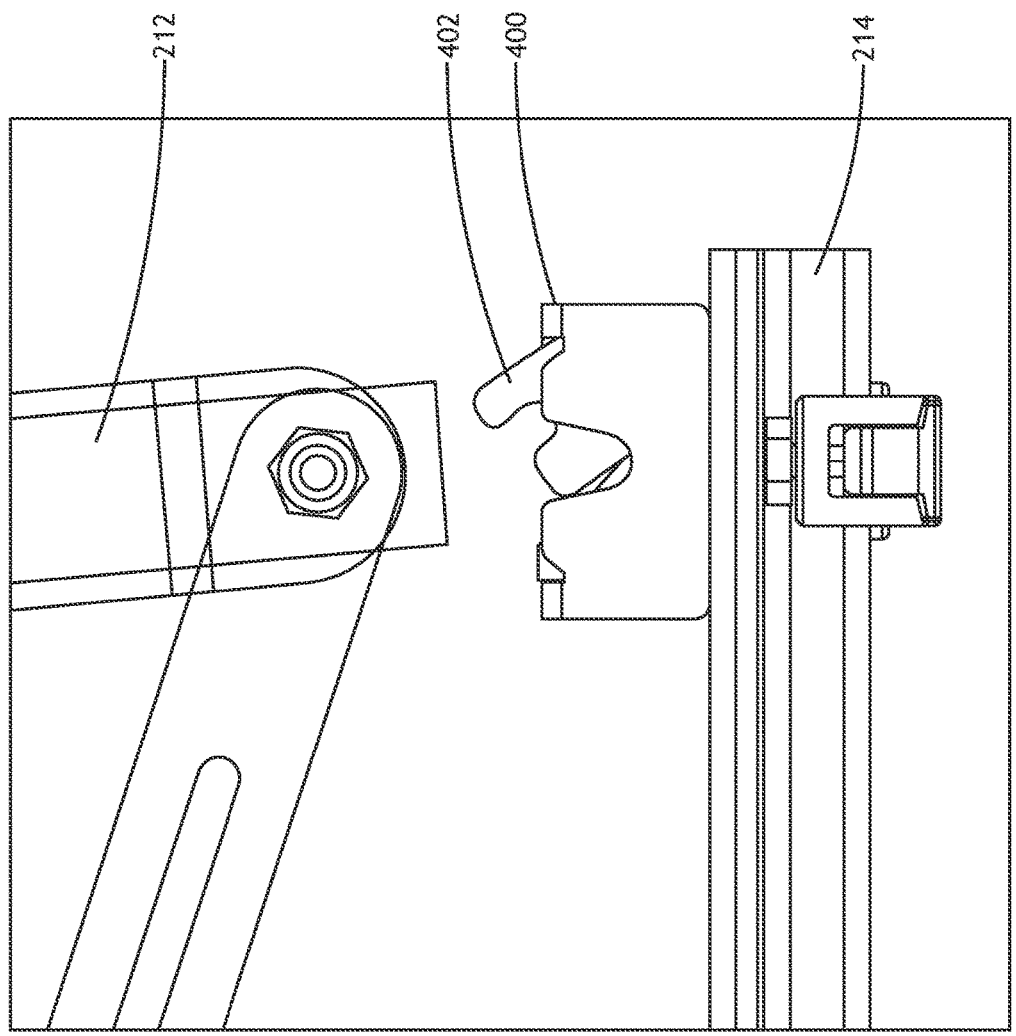
FIG. 4B illustrates a closer side view of the latch assembly of the system, in accordance with one or more embodiments of the present disclosure.
Figure 4C:
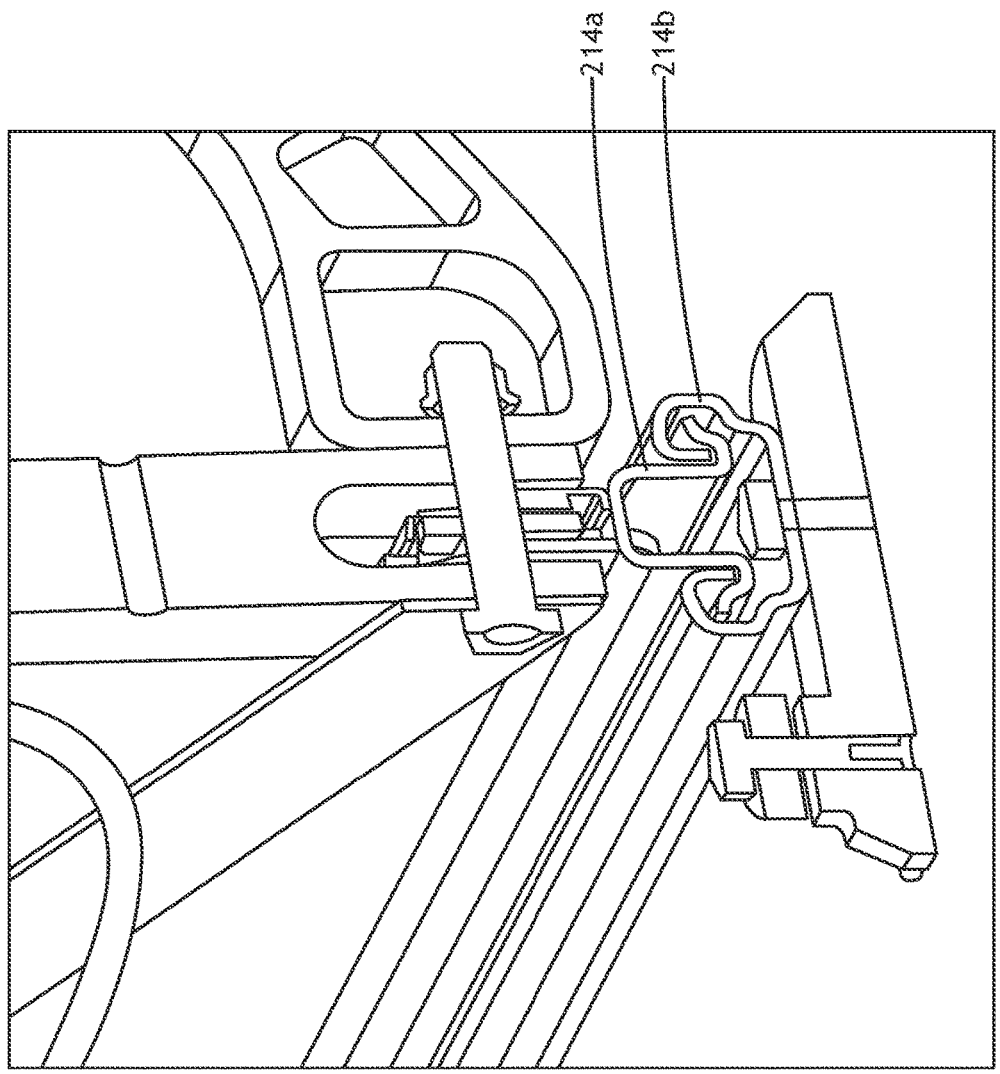
FIG. 4C illustrates a cross-sectional view of the latch assembly of the system, in accordance with one or more embodiments of the present disclosure.
Figure 4D:
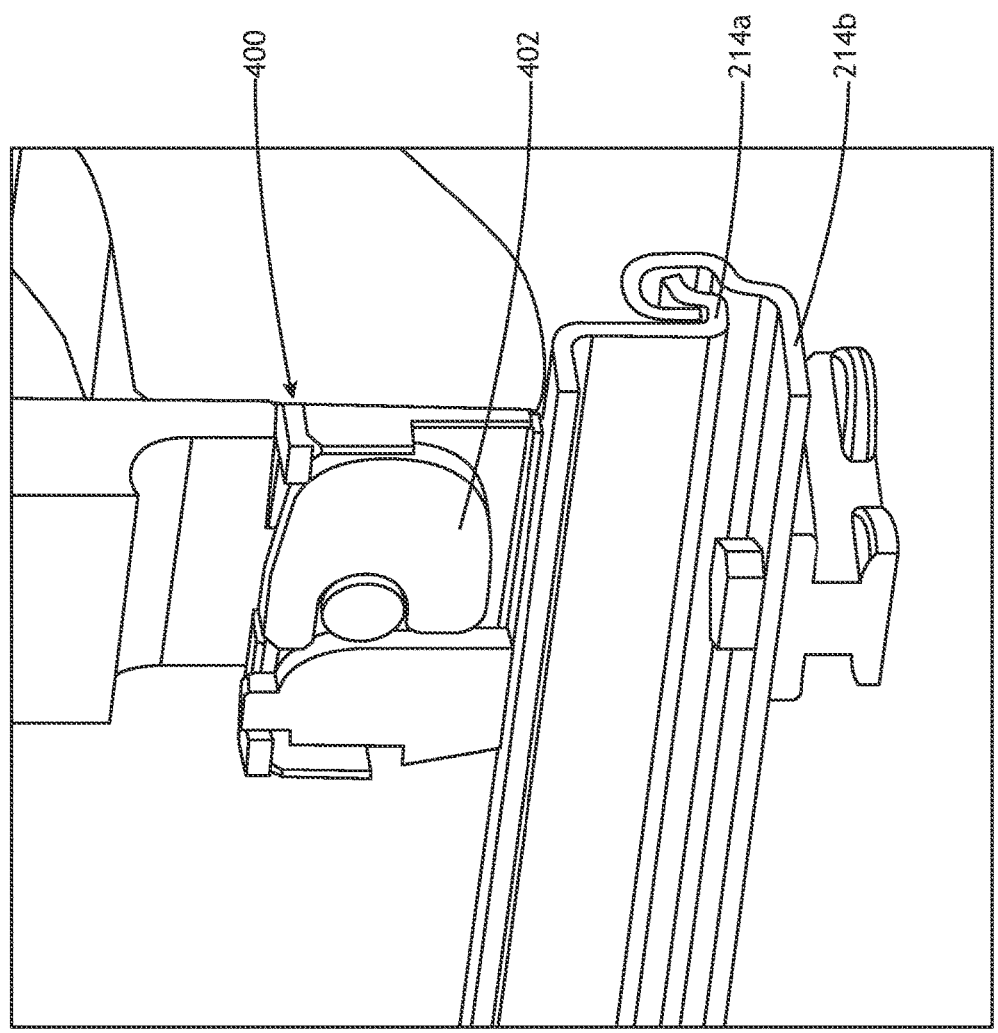
FIG. 4D illustrates a simplified schematic view of the latch assembly of the system, in accordance with one or more embodiments of the present disclosure.

When in the open position, as shown in FIG. 4B, the latch hook 402 may be configured to release the one or more legs 212 by detaching from the leg bracket 213 of the one or more legs 212. For example, upon pulling the release handle 316, the one or more cables 318 may be configured to open the latch hook 402 to release the leg bracket 213 from the latch hook 402, such that the divan 200 may be configured to actuate to the rotated (or tumbled position).

Figure 5A:
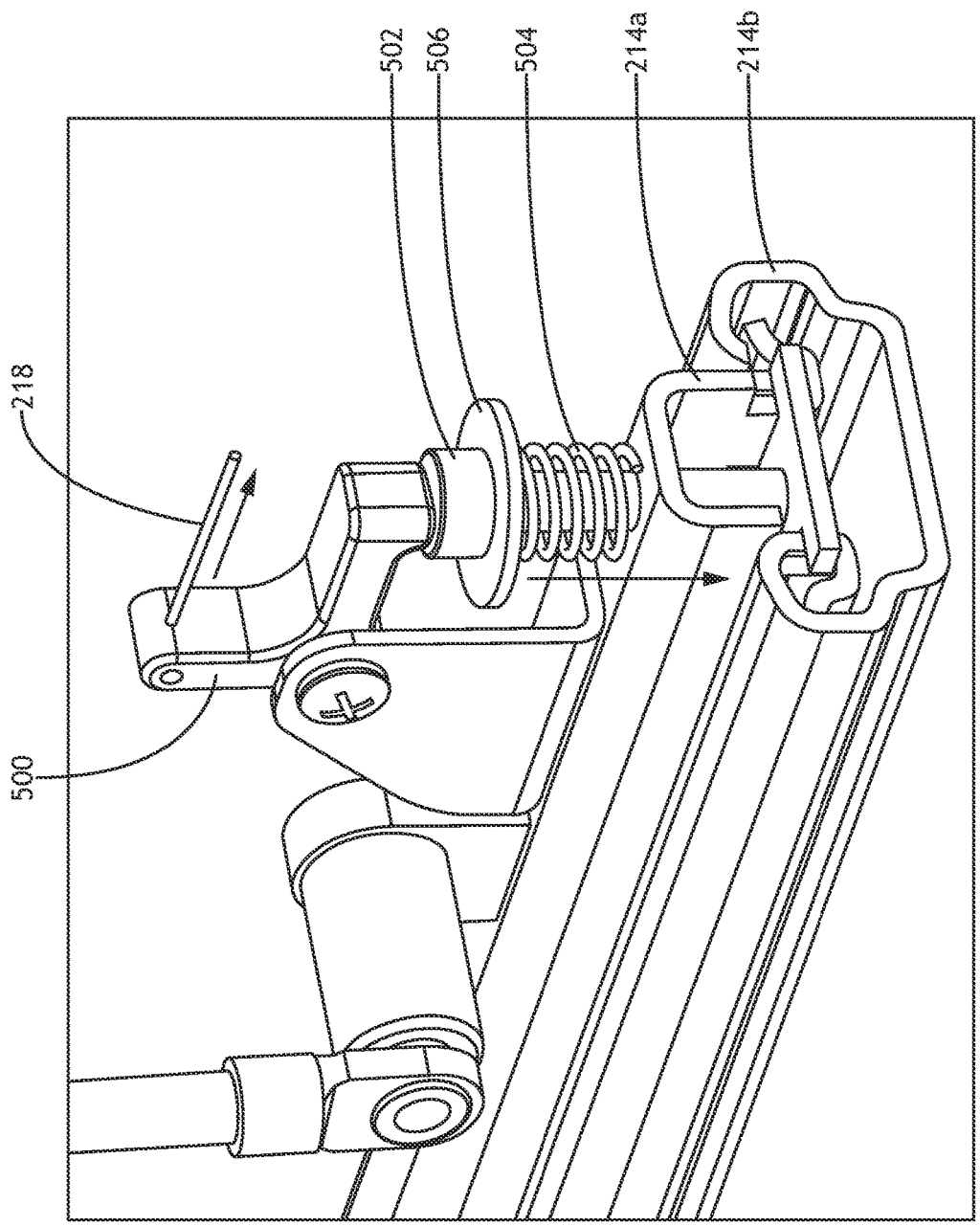
FIG. 5A illustrates a simplified schematic view of a lock assembly of the system, in accordance with one or more embodiments of the present disclosure.
Figure 5B:
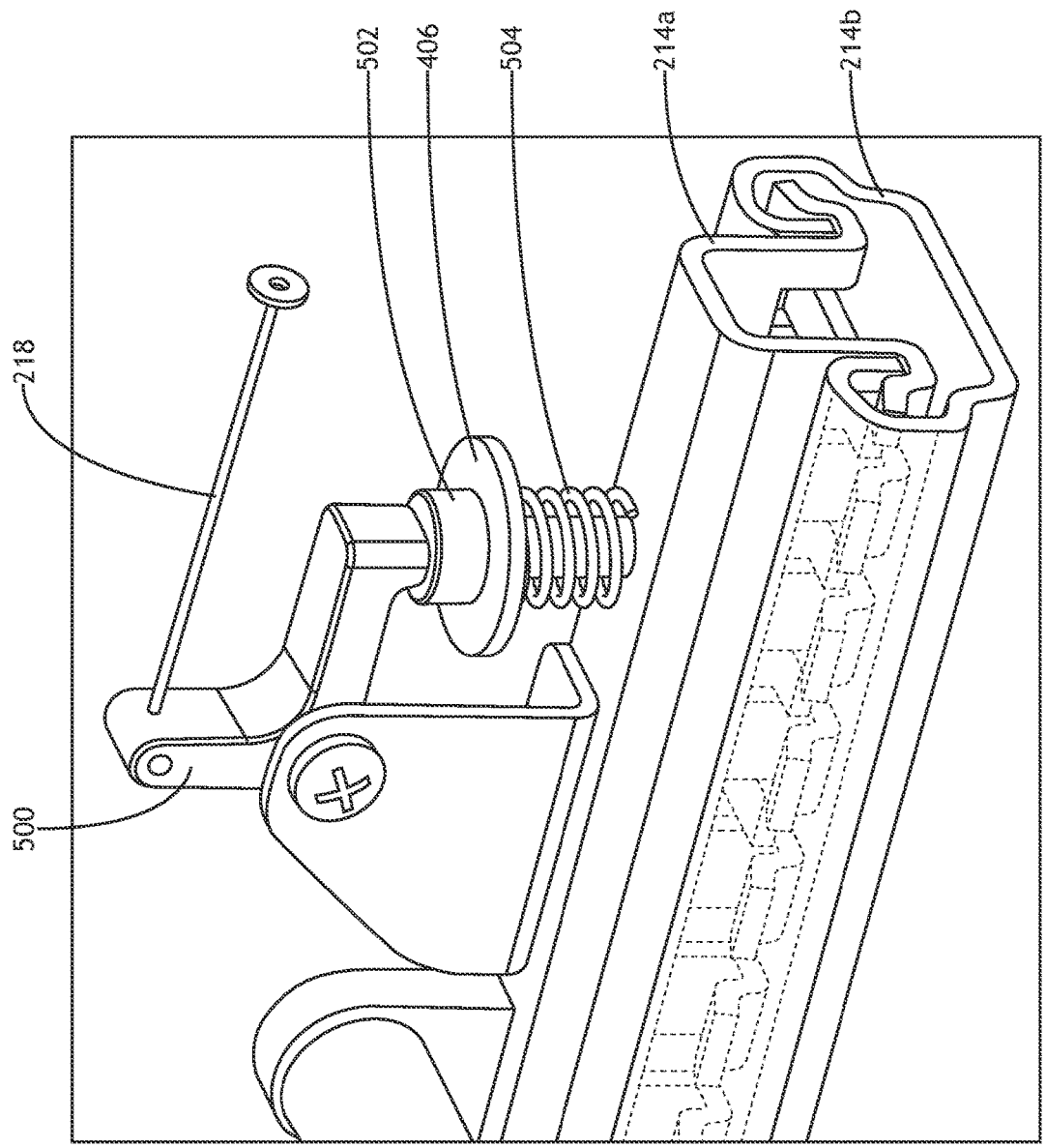
FIG. 5B illustrates a simplified schematic view of the lock assembly of the system, in accordance with one or more embodiments of the present disclosure.

FIGS. 5A-5B illustrate simplified schematics of the lock assembly 110 the quick release system 104 for the divan 200, in accordance with one or more embodiments of the present disclosure.

The lock assembly 110 may include a lever 500 coupled to the one or more release cables 218. For example, the one or more cables 218 may be configured to pull the lever 500. In this regard, the lever 500 may be configured to push a lock plate 502 down and unlock the track 214.

The lock plate 502 may be configured to translate between the unlocked and lock position by compressing a spring 504 coupled to a shaft of the lock plate 502 via one or more plungers (or bearings) 506.

When in the extended position (e.g., translated position), the track 504 may be in a locked position to prevent accidental outboard movement of the apparatus 102 during maintenance.

Figure 6B:
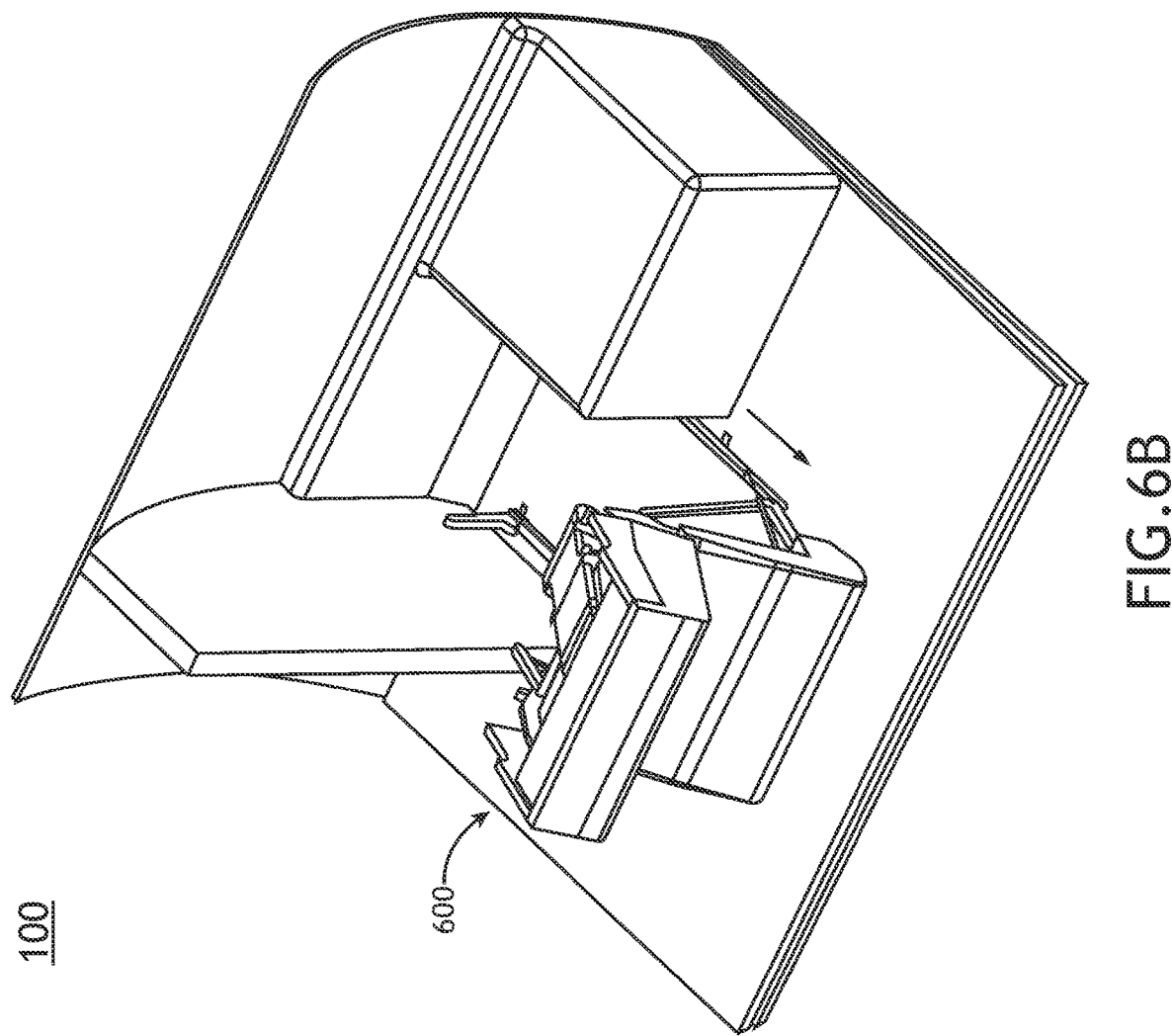
FIG. 6B illustrates a simplified schematic view of the quick release system for a divan, in accordance with one or more embodiments of the present disclosure.

FIGS. 6A-6B illustrate an alternate/additional embodiment of a divan 600 including the quick release system 100, in accordance with one or more embodiments of the present disclosure.

In some embodiments, the latch assembly 108 may be coupled to the one or more legs 212 of the divan 600. For example, the one or more legs 212 may be fixed to the one or more tracks 214, such that the latch assembly 108 couples the base assembly to the frame 201. For instance, a rear set of legs 212a may be fixed to the tracks 214 when the divan 600 is rotated and/or translated. In this regard, the divan 600 may be rotated about an axis of the front legs 212b, which may be coupled to the divan 600 and the tracks 214.

Figure 7:
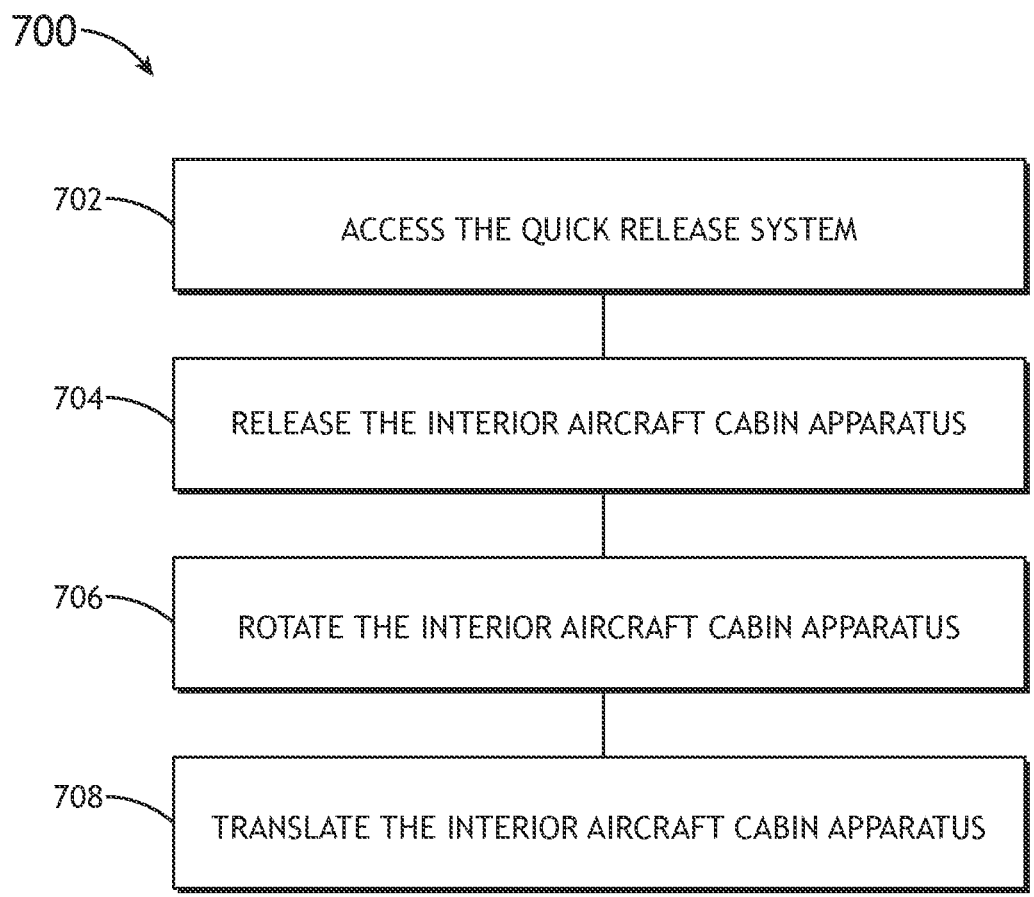
FIG. 7 illustrates a flowchart depicting a method or process of rotating and sliding an interior aircraft cabin apparatus using the quick release system, in accordance with one or more embodiments of the present disclosure.

FIG. 7 illustrates a flowchart depicting a method or process 700 of rotating and translating an interior aircraft cabin apparatus 102 using the quick release system 104, in accordance with one or more embodiments of the present disclosure. FIGS. 8A-8D illustrate a simplified schematic of method or process of rotating and translating the divan 200 (or divan 600), in accordance with one or more embodiments of the present disclosure.

In a step 702, the quick release system 100 may be accessed. For example, as shown in FIG. 8B, where the interior aircraft cabin apparatus 102 is a divan 200 (or divan 600), a storage compartment drawer 800 may be removed. For instance, the storage compartment drawer 800 may be removed from the storage compartment 802 by sliding out the drawer 800. By way of another example, as shown in FIG. 8C, where the interior aircraft cabin apparatus 102 is a divan 200 (or divan 600), one or more cushions 206, 208 may be removed. By way of another example, one or more power cables or accessory/equipment cords may be unplugged. By way of another example, as shown in FIGS. 9A-9B, where the interior aircraft cabin apparatus 102 is a monument 900, a housing (or sell) may be removed to access the quick release system 100.

In a step 704, the interior aircraft cabin apparatus 102 may be released. For example, the one or more latches 400 of the latch assembly 108 may be unlatched to release interior aircraft cabin apparatus 102 from the quick release system 100. For instance, where the interior aircraft cabin apparatus 102 is a divan 200 (or divan 600), the release handle 316 may be pulled to cause the one or more cables 318 to unlatch the latch 400. Further, the one or more cables 318 may rotate the latch hook 402 to the open position such that the one or more leg brackets 213 may be released from the latch hook 402.

By way of another example, the locking assembly 110 may be unlocked from the track 214. For instance, where the interior aircraft cabin apparatus 102 is a divan 200 (or divan 600), the release handle 316 may be pulled to cause the one or more cables 318 to push the lock plate 502 down via the lever 500. Further, the one or more cables 318 may push down the lock plate 502 and unlock the track from the track fitting.

In a step 706, the interior aircraft cabin apparatus 102 may be rotated (or tumbled). For example, as shown in FIG. 8D, where the interior aircraft cabin apparatus 102 is a divan 200 (or divan 600), the divan 200 (or divan 600) may rotate about a front axis of the front leg 212.

In a step 708, the interior aircraft cabin apparatus 102 may be translated (or slid). For example, as shown in FIG. 8E, where the interior aircraft cabin apparatus 102 is a divan 200 (or divan 600), the divan 200 (or divan 600) may translate along an axis of the track 214.

It is noted that step 708 may be performed prior to step 706. Further, it is noted that steps 706 and 708 may be perform simultaneously. Therefore, the above discussion shall not be construed as limiting the scope of the present disclosure.

Although FIGS. 2-8E depict the quick release system 104 installed within a divan 200 (or divan 600), it is noted that the quick release system 104 may be installed within any interior aircraft cabin apparatus 102. For example, as shown in FIGS. 9A-9B, the quick release system 104 may be installed within a monument 900.

Figure 10A:
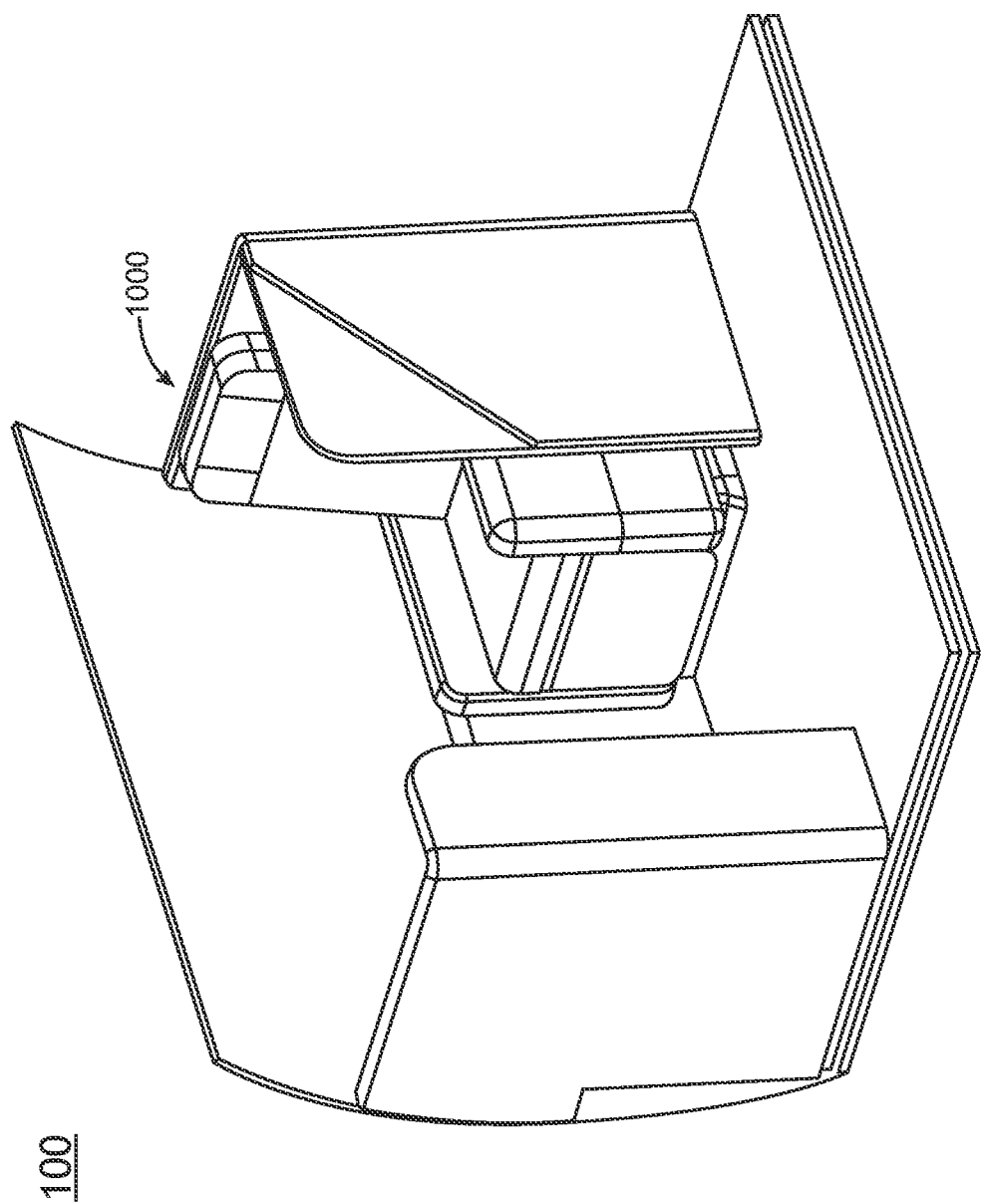
Figure 10B:
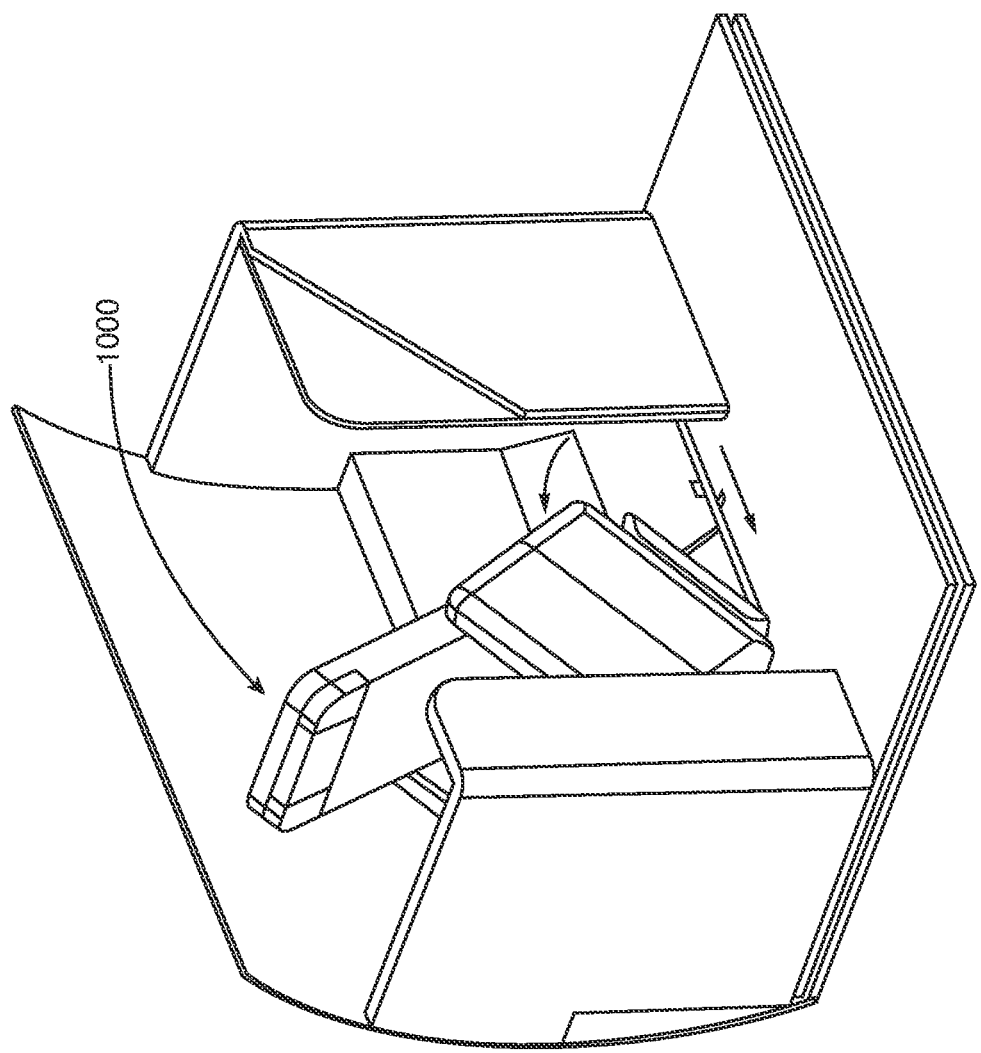

By way of another example, as shown in FIGS. 10A-10B, the quick release system 104 may be installed within an aircraft seat 1000.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A quick release system for an interior aircraft cabin apparatus, the quick release system comprising:
   a release assembly, the release assembly including one or more release handles and one or more release cables, the one or more release cables coupled to the one or more release handles, the one or more release handles configured to pull the one or more release cables when a force is applied to the one or more release handles;
   a latch assembly, the latch assembly including one or more latches coupled to the one or more release cables, the one or more latches including one or more latch hooks configured to be positioned in one of an open position or a closed position, upon applying the force to the one or more release handles, the one or more latch hooks, when in the open position, are configured to release a portion of the interior aircraft cabin apparatus to cause the interior aircraft cabin apparatus to rotate about an axis towards a floor of an aircraft cabin; and
   a locking assembly, the locking assembly including a lever and a lock plate, the lever coupled to the one or more release cables, the lock plate arranged proximate to one or more interior aircraft cabin apparatus tracks couplable to the floor of the aircraft cabin, the lock plate configured to be positioned in one of a locked position or an unlocked position, upon applying the force to the one or more release handles, the lock plate is configured to translate between the locked position and the unlocked position to disengage the lock plate from a portion of the one or more interior aircraft cabin apparatus tracks to cause the interior aircraft cabin apparatus to translate along an axis of the one or more interior aircraft cabin apparatus tracks.

2. The system of claim 1, wherein the interior aircraft cabin apparatus comprises:
   a divan.

3. The system of claim 2, wherein the latch assembly is coupled to a rear portion of the one or more interior aircraft cabin apparatus tracks, the latch assembly positioned proximate to one or more rear legs of the divan.

4. The system of claim 3, wherein the divan is configured to rotate about a front axis of one or more leg brackets of one or more front legs.

5. The system of claim 2, wherein the latch assembly is coupled to one or more rear legs of the divan, the one or more rear legs fixed to the one or more tracks coupled to the floor of the aircraft cabin.

6. The system of claim 5, wherein the divan is configured to rotate about a front axis of one or more leg brackets of one or more front legs towards the floor of the aircraft cabin.

7. The system of claim 2, wherein the divan comprises:
   a seat frame,
   the seat frame including a seatback frame and a seat pan frame,
   the seatback frame including a seatback cushion,
   the seat pan frame including a seat pan cushion.

8. The system of claim 7, wherein the one or more release handles are coupled to a portion of the seat pan frame.

9. The system of claim 8, wherein one of the seatback cushion or the seat pan cushion is removed prior to applying the force to the one or more release handles coupled to the portion of the seat pan frame.

10. The system of claim 1, wherein the interior aircraft cabin apparatus comprises:
    an aircraft seat.

11. The system of claim 1, wherein the interior aircraft cabin apparatus comprises:
    an aircraft cabin monument.

12. The system of claim 1, further comprising:
    an actuation assembly, the actuation assembly including one or more actuators configured to assist with one of the rotation or the translation.

13. The system of claim 12, wherein the one or more actuators include at least one gas spring actuator.

14. The system of claim 1, wherein the one or more latches including one or more rotary latches.

15. The system of claim 14, wherein the one or more latch hooks are configured to rotate between one of the open position or the closed position.

* * * * *